United States Patent
Engelbert

[19]

[11] Patent Number: 6,144,137
[45] Date of Patent: *Nov. 7, 2000

[54] ELECTRIC MOTOR ASSEMBLY FOR A VEHICLE STEERING SYSTEM

[75] Inventor: Lu Engelbert, Ann Arbor, Mich.

[73] Assignee: TRW Inc., Lyndhurst, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/203,990

[22] Filed: Dec. 2, 1998

[51] Int. Cl.[7] .............................. H02K 1/12; H02K 5/24; H02K 5/00
[52] U.S. Cl. ................................ 310/258; 310/51; 310/89
[58] Field of Search .................................. 310/89, 86, 88, 310/51, 258, 254; 336/90, 100; 318/560; 180/400, 404, 412, 443, 446

[56] References Cited

U.S. PATENT DOCUMENTS

| | | | |
|---|---|---|---|
| 1,688,891 | 10/1928 | Spreen | 310/51 |
| 2,112,747 | 3/1938 | Wood | 171/252 |
| 2,193,408 | 3/1940 | Knight | 310/258 |
| 2,367,428 | 1/1945 | Divi | 310/258 |
| 2,465,275 | 3/1949 | Rushing et al. | 310/258 |
| 2,632,861 | 3/1953 | Morton et al. | 310/258 |
| 2,953,699 | 9/1960 | Redding | 310/258 |
| 3,278,773 | 10/1966 | Mikina | 310/51 |
| 3,708,707 | 1/1973 | Kranz | 310/258 |
| 4,145,626 | 3/1979 | Aroshidze et al. | 310/91 |
| 4,564,779 | 1/1986 | Terry | 310/258 |
| 4,587,722 | 5/1986 | Miller | 29/596 |
| 5,006,748 | 4/1991 | Wintermute | 310/258 |
| 5,257,828 | 11/1993 | Miller et al. | 180/446 |
| 5,521,447 | 5/1996 | Bertolini et al. | 310/51 |
| 5,767,602 | 6/1998 | Sargeant | 310/258 |
| 5,783,892 | 7/1998 | Kanzaki et al. | 310/258 |

FOREIGN PATENT DOCUMENTS

| | | |
|---|---|---|
| 0550706 | 7/1993 | European Pat. Off. . |
| 0637537 | 8/1995 | European Pat. Off. . |
| 1213267 | 3/1966 | Germany . |
| 19504970 | 8/1996 | Germany . |

OTHER PUBLICATIONS

European Search Report EP 99 12 3270.

*Primary Examiner*—Nestor Ramirez
*Assistant Examiner*—Dang Dinh Le
*Attorney, Agent, or Firm*—Tarolli, Sundheim, Covell, Tummino & Szabo L.L.P.

[57] ABSTRACT

A motor assembly (52) for a vehicle steering system (10) includes a housing (80) having an interior sidewall portion (82) and spaced apart end portions (86, 88). The assembly (52) also includes a stator (92) positioned within the housing (80). The stator (92) has an outer sidewall portion (98), a substantial part of which is spaced from the interior sidewall (82) of the housing (80). The interior sidewall portion (82) of the housing (80) is connected with the outer sidewall portion (98) of the stator (92) at predetermined contact areas (100) located proximate structural nodal points of the stator (92) for reducing acoustic noise during operation of the motor assembly (52).

5 Claims, 4 Drawing Sheets

ELECTRIC MOTOR ASSEMBLY FOR A VEHICLE STEERING SYSTEM

TECHNICAL FIELD

The present invention relates to an electric motor and, more particularly, to an electric motor for a power assist vehicle steering system.

BACKGROUND OF THE INVENTION

Power assist vehicle steering systems are well known in the art. One common type of power assist vehicle steering system utilizes a rack and pinion gear with an electric motor. Linear movement of the rack causes turning of steerable wheels of the vehicle. The electric motor may apply rotary force to a steering shaft, which is connected to the pinion gear, or the electric motor may apply linear force to the rack.

The electric motor is responsive to torque applied to the steering wheel. A torque sensor provides signals to a controller indicative of the amount of torque being applied. The controller controls the energization of the electric motor in response to the torque sensor signal to provide desired steering assist.

SUMMARY OF THE INVENTION

The present invention is directed to an electric motor assembly for a vehicle steering system. The assembly includes a housing having an interior sidewall portion and spaced apart end portions. The assembly also includes a stator positioned within the housing. The stator has an outer surface, a substantial part of which is spaced from the interior sidewall portion of the housing. The interior sidewall portion of the housing is connected with the stator at predetermined contact points located proximate structural nodes of the stator to thereby reduce acoustic noise of the motor assembly upon operation of the motor assembly.

BRIEF DESCRIPTION OF THE DRAWINGS

The foregoing and other features of the present invention will become more apparent to one skilled in the art upon consideration of the following description of the invention and the accompanying drawings in which.

DESCRIPTION OF A PREFERRED EMBODIMENT

Figure 1:
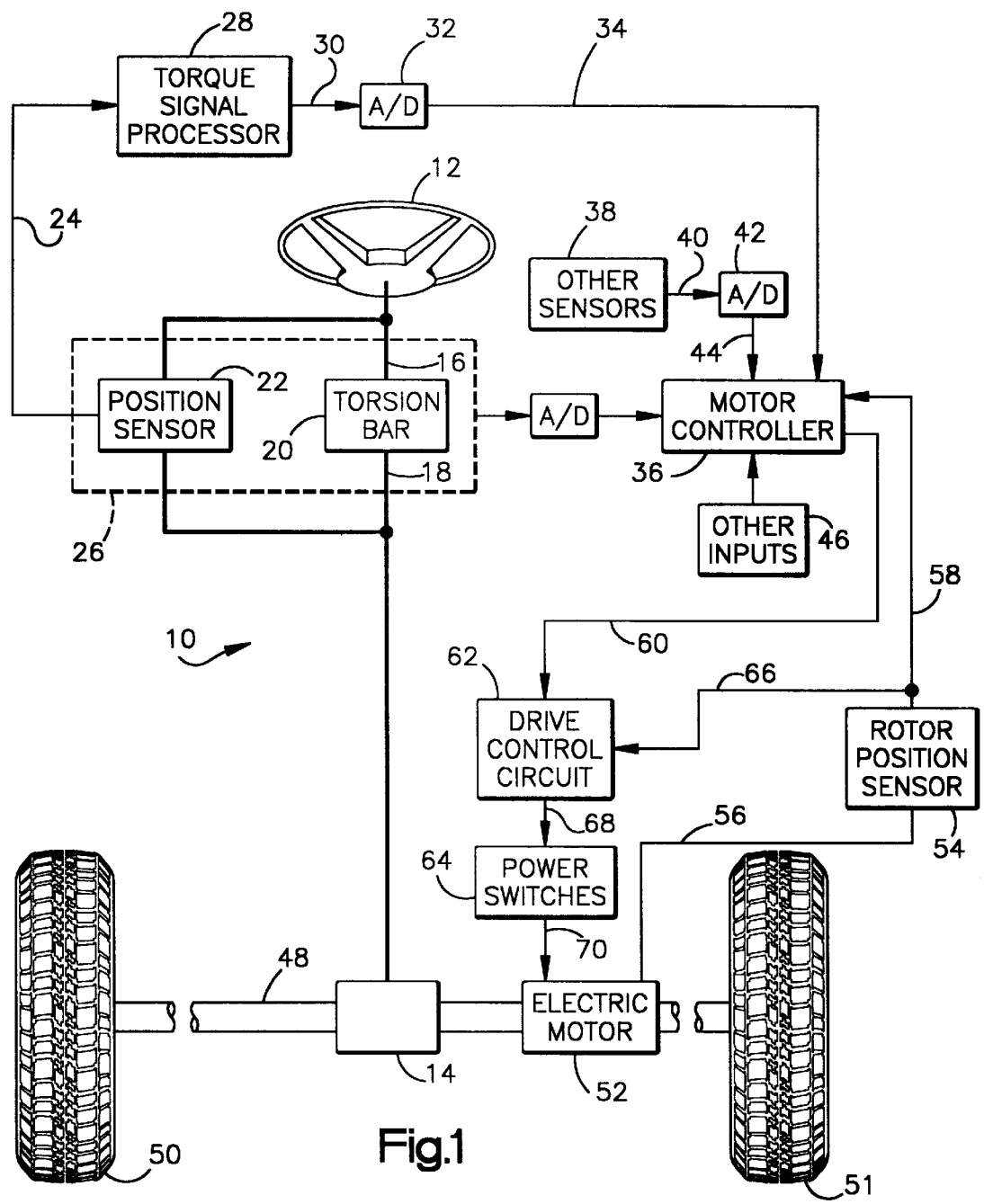
FIG. 1 is a schematic block diagram of a vehicle steering system in accordance with a preferred embodiment of the present invention.

FIG. 1 schematically illustrates an electric assist vehicle steering system 10 in accordance with a preferred embodiment of the present invention. The steering system 10 includes a steering wheel 12 operatively connected to a pinion gear 14. The steering wheel 12 is connected to an input shaft 16 and the pinion gear 14 is connected to an output shaft 18. The input shaft 16 is connected to the output shaft 18 through a torsion bar 20.

The torsion bar 20 twists in response to torque applied to the steering wheel 12. This permits relative rotation between the input shaft 16 and the output shaft 18. The torsion bar 20 has a predetermined spring constant which determines the amount of relative rotation between the input shaft 16 and the output shaft 18 in response to torque applied to the steering wheel 12.

A position sensor 22 is operatively connected across the input shaft 16 and the output shaft 18. The position sensor 22 provides an electric signal 24 indicative of the amount of relative rotation or relative position of the input shaft and the output shaft 18. The position sensor 22 in combination with the torsion bar 20 define a torque sensor 26. The position sensor signal 24 is supplied to a torque signal processor 28.

The torque signal processor 28 determines a value indicative of the applied steering torque based upon the known spring constant of the torsion bar 20 and the position sensor signal 24. The torque signal processor 28 typically includes suitable filters, which may be analog and/or digital filters, to remove unwanted frequency components. Such processing of the position sensor signal 24 is well known in the art.

The torque signal processor 28 provides an output signal 30 to a suitable analog-to-digital (A/D) converter 32. Alternatively, the torque signal processor may contain appropriate A/D conversion circuitry. The A/D converter 32 provides a digital output signal 34 to a motor controller 36. The digital signal 34 preferably is a torque demand signal indicating the magnitude and direction of torque being applied to the steering wheel 12 by the vehicle operator. It will be understood and appreciated that other types of processing may be used to obtain a signal indicative of applied torque.

Preferably, another sensor block 38 also provides a signal 40 for use in determining the amount of steering assist to be supplied by the system 10. The signal 40 is applied to an A/D converter 42 which provides a digital signal 44 to the motor controller 36. Suitable other sensors 38 may include, for example, a vehicle speed sensor or other sensors which provide useful information about road and/or vehicle conditions. A vehicle speed sensor enables the motor controller 36 to provide speed proportional steering, which is well known in the art.

Other inputs 46 also may be provided to the motor controller 36. Such other inputs 46 may include, for example, a motor controller temperature sensor and/or soft-start circuitry. A more detailed description of appropriate other inputs is provided in U.S. Pat. No. 5,257,828 to Miller et al., which is assigned to TRW Inc. and which is fully incorporated herein by reference.

As is well known in the art, the pinion gear 14 has helical teeth which meshingly engage corresponding teeth on a rack or linear steering member 48. The rack 48 is connected with the vehicle's steerable wheels 50 and 51 by steering linkages in a known manner. When a vehicle operator rotates the steering wheel 12, the rack and pinion gear set converts the rotary motion of the steering wheel 12 into linear motion of the rack member 48. This provides for the turning movement of the steerable wheels 50 and 51.

An electric assist motor assembly 52 also is drivingly connected to the steering member 48. Preferably, the electric motor assembly 52 is connected to the steering member 48 through a ball-nut drive arrangement. A suitable drive arrangement, for example, is shown and described in U.S.

Pat. No. 5,257,828. Other drive arrangements also may be used. When the electric motor 52 is energized, it provides for assist steering to aid the vehicle operator to turn the wheels 50 and 51.

Preferably, the electric motor assembly 52 is a variable reluctance motor. A variable reluctance motor commonly is used in a power assist steering system because of its relatively small size, low friction and high torque-to-inertia ratio.

The operation and control of such an electric assist motor assembly 52 is well known in the art. A rotor position sensor 54 is operatively connected to the electric motor assembly 52, indicated schematically by a connection 56. One function of the rotor position sensor 54 is to provide a rotor position signal 58 to the motor controller 36. The rotor position signal 58 indicates the position of the rotor relative to the stator of the motor assembly 52.

The motor controller 36 provides a control signal 60 to a drive control circuit 62. The drive control circuit 62 is connected with a plurality of power switches 64, which control the application of electrical energy to the electric motor assembly 52. The drive control circuit 62 also receives a rotor position signal 66 from the rotor position sensor 54. This is because control of a variable reluctance motor, such as the motor 52, requires that the relative position between the rotor and the stator be known. The drive control circuit 62 provides a control signal 68 to the power switches 64. The power switches 64 preferably are in the form of an array of MOSFET transistors, although other controllable switching devices may be used. The power switches 64 are controlled to provide an electrical energy signal 70 to the electric motor assembly 52. The electrical energy 70 controls the direction and amount of torque to be applied by the electric motor assembly 52.

Figure 2:
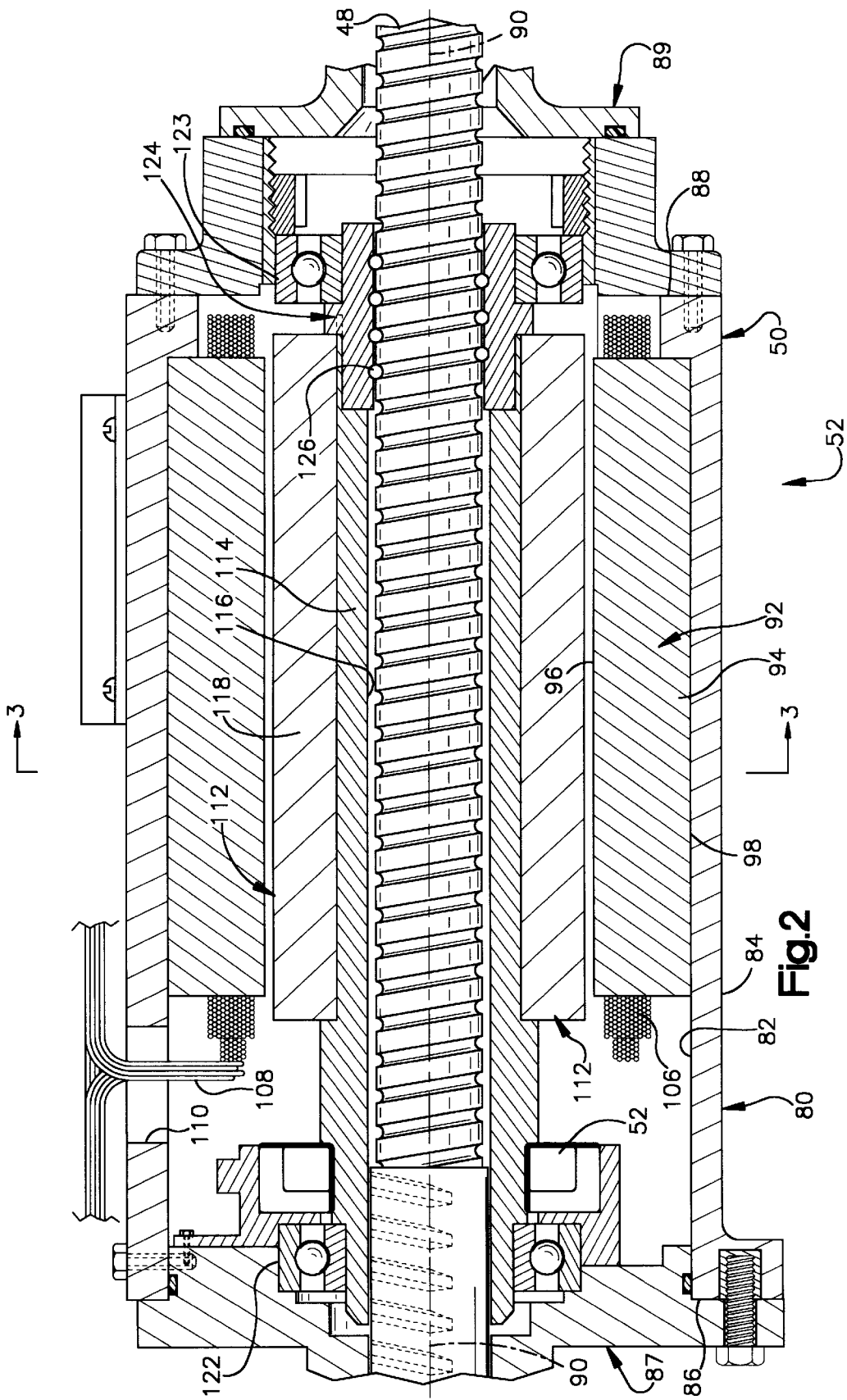
FIG. 2 is a sectional view of a motor assembly in accordance with a preferred embodiment of the present invention.
Figures 3, 6:
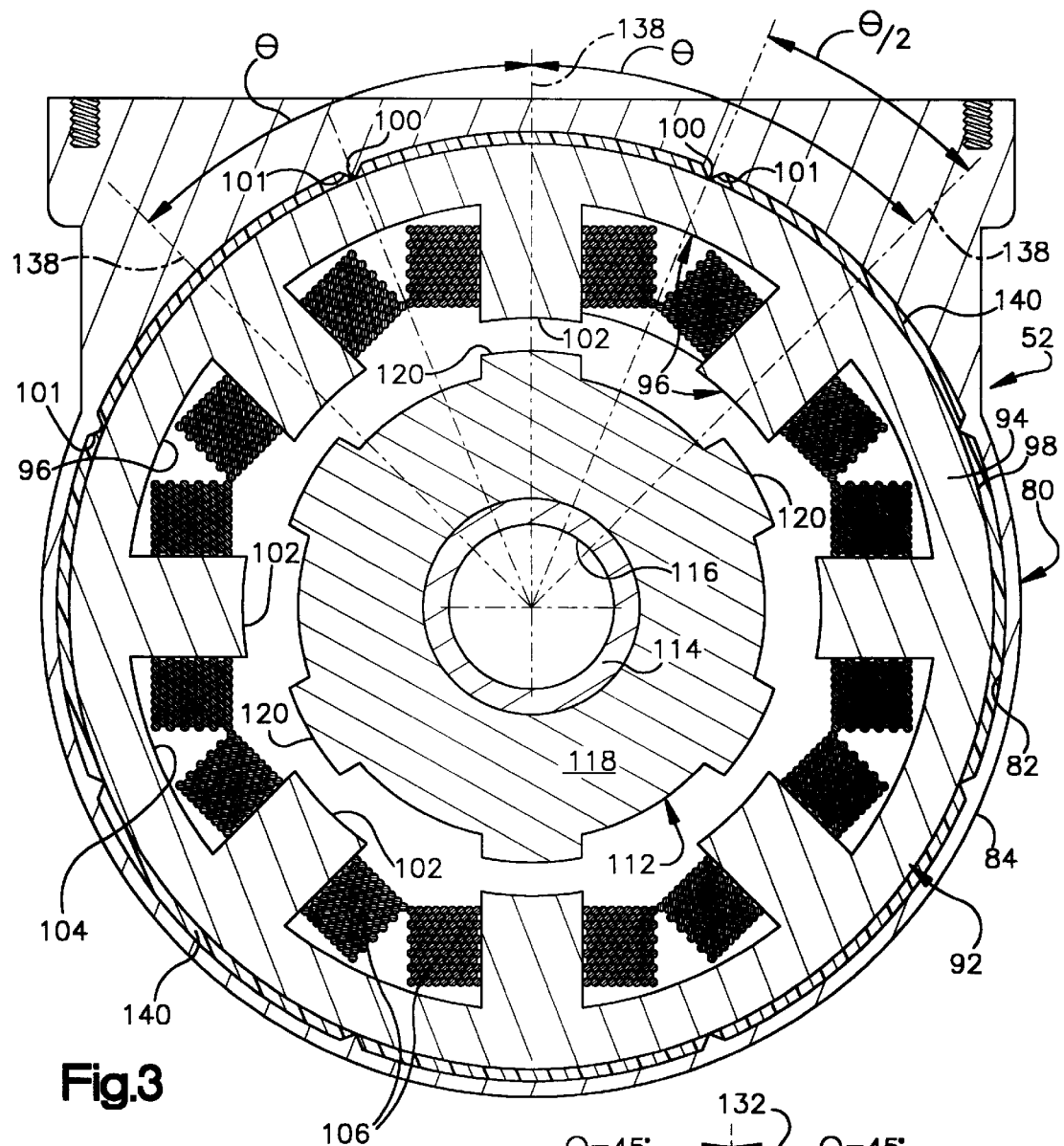
FIG. 3 is a sectional view of the motor assembly of FIG. 2 taken along line 3—3 of FIG. 2.
FIG. 6 is a representation of the first structural node for the motor of FIG. 2.

FIGS. 2 and 3 illustrate a preferred embodiment of the electric assist motor assembly 52 in accordance with the present invention. The motor assembly 52 is illustrated as a four phase variable reluctance motor, although other types of motors also may be used. The electric motor assembly 52 includes an elongated, cylindrical outer shell or housing 80. The housing 80 includes an interior sidewall portion 82 and an exterior sidewall portion 84. The housing 80 also includes first and second spaced apart ends 86 and 88. End portions 87 and 89 are fastened to the respective ends 86 and 88 to enclose the contents of the housing 80. A central axis 90 extends longitudinally through the first and second ends 86 and 88. The housing 80 preferably is formed of a rigid material, such as aluminum or another suitable rigid material.

An elongated stator 92 is positioned within the housing 80 extending coaxially intermediate the first and second ends 86 and 88 of the housing. The stator 92 includes a cylindrical metal core 94, which preferably is formed of a plurality of axially stacked laminations. The laminations are secured together, suitably by laser welding, to form the core 94. The stator 92 has an inner sidewall portion 96 and an outer sidewall portion 98. The inner portion 96 of the stator 92 includes a plurality of axially extending stator poles 102. The stator poles 102 project radially inward and form a plurality of axially extending slots 104 intermediate each adjacent pair of stator poles. The stator poles 102 are disposed in a circular array around the axis 90 and are circumferentially spaced apart by the slots 104. In the preferred embodiment of FIG. 3 there are 8 stator poles 102, although any numbers of stator poles may be used.

A plurality of stator windings 106 are disposed in the slots 104, suitably wound around the stator poles 102. The stator windings 106 are wound onto the stator core 94, such that they do not engage the housing 80. The stator windings 106 have corresponding lead wires 108 which extend through an aperture 110 formed in the housing 80. The lead wires 108 extend out of the stator housing 80 and connect with appropriate vehicle electric circuitry, such as with the power switches 62.

The electric assist motor 52 also includes a rotor assembly 112 rotatably mounted coaxially within the stator 92. The rotor assembly 112 preferably includes an elongated cylindrical rotor shaft 114 having an inner cylindrical central passage 116 through which the rack member 48 extends.

A rotor 118 is secured about the rotor shaft 114, suitably press-fit onto the rotor shaft. The rotor 118 includes a plurality of circumferentially spaced apart rotor poles 120 extending radially from the periphery of the rotor. The rotor poles 120 are disposed in a circular array around the axis 90. The rotor poles 120 are positioned adjacent and spaced from the circular array of stator poles 102. In the preferred embodiment of FIG. 3, there are six rotor poles 120, although any appropriate number of rotor poles may be used. The rotor 118 is formed of a suitable metal, such as a ferrous material, such that the rotor poles 120 are responsive to the electric field provided by the stator 92 when energized.

The preferred embodiment of FIG. 2 illustrates bearing supports 122 and 123 which support the rotor assembly 112 for rotation relative to the stator 92 and the housing 80. The rotor shaft 114 is operatively connected to the axially extending rack member 48 by a ball nut assembly 124. The ball nut assembly 124 includes a plurality of force-transmitting members, suitably in the form of rigid balls 126. The balls 126 are disposed between internal threads of the ball nut 124 and corresponding external threads on a screw portion of the steering member 48. The balls 126 are loaded into the ball nut assembly 124 in a known manner. When the stator 92 is energized by the motor controller 36, the rotor assembly 112 rotates. This, in turn, effects linear movement of the steering member 48 through the ball nut assembly 124 and, thereby, aids in turning the steerable wheels 50 and 51.

In order to reduce acoustic noise of the motor assembly 52, a substantial part of the outer sidewall 98 of the stator 92 is spaced apart from the interior sidewall portion 82 of the housing 80, such as shown in FIG. 3. In addition, the interior sidewall portion 82 of the housing 80 engages the outer sidewall 98 of the stator 92 at predetermined contact areas 100. The contact areas 100 may be a plurality of discrete contact points or axially extending contact regions.

The contact areas 100 are selected to be located proximate structural nodes of the stator 92. In the embodiment of FIG. 3, the contact areas 100 are defined by axially extending projections 101 which protrude from the interior sidewall portion 82 of the housing 80 and engage the outer sidewall 98 of the stator 92 at the predetermined contact areas 100. A minimum amount of contact between the stator 92 and the housing 80 is preferred, although slightly thicker axially extending contact areas, which include the predetermined contact areas 100, also will suffice to reduce acoustic noise. As described below, the location of the contact areas 100 between the stator 92 and the housing 80 are selected according to the structural characteristics of the motor assembly 52.

The stator 92 may be affixed to the housing 80 at the axially extending contact areas 100, such as, for example, by welding or press fitting the housing 80 to the stator 92. In addition, the housing 80 may be cast around the stator 92, such that the outer sidewall 98 of the stator 92 is spaced from the interior sidewall portion 82 of the housing 80, except along the axially extending contact areas 100.

Every motor assembly has several structural modes of vibration. In a conventional electric steering motor assembly, the outer sidewall of the stator usually completely engages or is affixed to the housing. For example, the housing typically is molded onto or cast around the stator. Thus, in a conventional electric motor assembly, such as for a power assist steering system, as the motor current fluctuates with frequency content that includes the structural modes, the structural vibrations of the stator are transmitted to the housing. The motor housing thus resonates causing unwanted acoustic noise.

Figure 4:
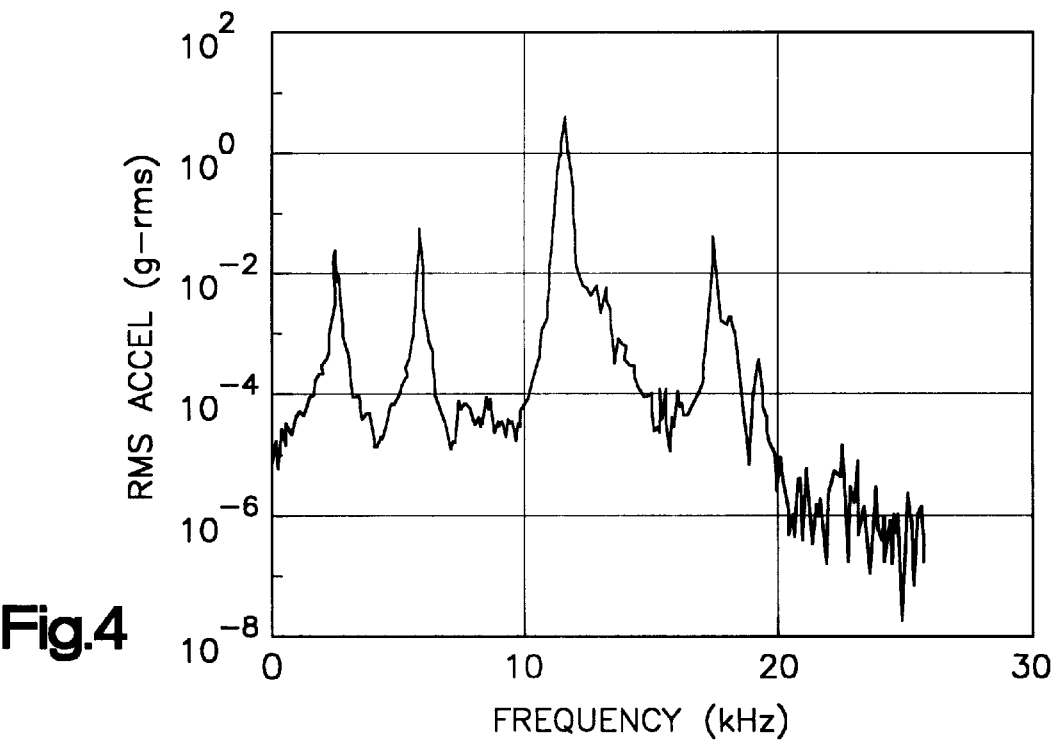
FIG. 4 is a graphical representation of acceleration versus frequency for the motor of FIG. 2.

FIG. 4 illustrates results of a structural modal analysis performed by measuring structural vibrations of a conventional four phase electric motor assembly. For a four phase motor, such as is shown in FIGS. 2 and 3, the structural modes may include about 2.5 Khz, 5.7 Khz, 11 Khz and 17 Khz. The structural vibrations may be measured, for example, by positioning one or more accelerometers around the outer surface of the motor housing and applying a step input current to excite the electric motor assembly.

It will be apparent to those skilled in the art that the frequencies corresponding to structural modes usually will be different for different types and configurations of motors. The present invention is applicable to all such electric motors.

Figure 5:
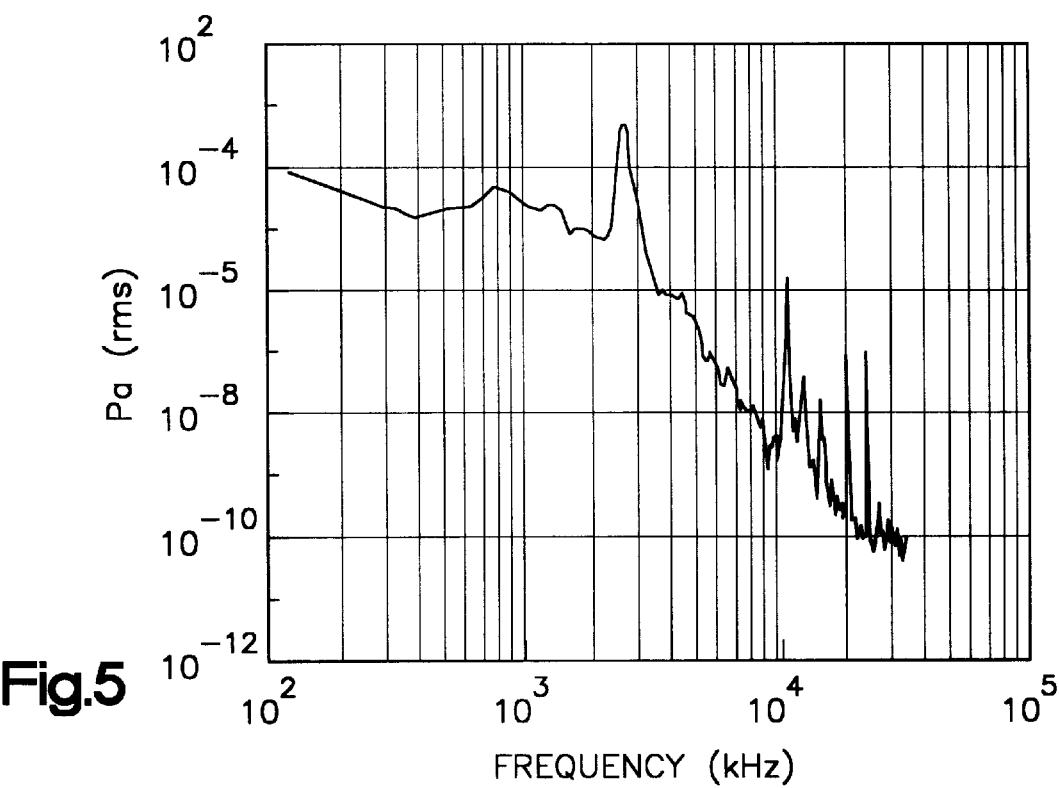
FIG. 5 is a graphical representation of acoustic noise versus frequency for the motor of FIG. 2.

FIG. 5 illustrates results of a power spectral density analysis for a four phase motor having structural modes at about 2.5 Khz, 5.7 Khz, 11 Khz, and 17 Khz. As shown in FIG. 5, the dominant mode of acoustic noise occurs at 2.5 Khz, which is the first structural mode. This corresponds to about 0.00045 Pa of RMS sound pressure, which is equivalent to an audible level of about 27.1 dB.

Referring to FIG. 6, the vibration of an electric motor results from magnetic forces, indicated at arrow 130, generated between an energized stator pole and a corresponding rotor pole. The magnetic forces 130 cause the stator 92 to vibrate in its structural modes. Acoustic noise is more sensitive to lower frequency structural vibration, such as in the motor's first structural mode of about 2.5 Khz.

FIG. 6 illustrates the shape of the first structural mode for the motor as elliptical. When a particular stator pole is energized, the stator vibrates between two elliptically shaped modes 132 and 134, which intersect at substantially stationary nodal points 136. The center of the energized stator pole corresponds to the force vector 130 shown in FIG. 6. With a four phase motor, such as illustrated in FIGS. 2 and 3, the nodal points 136 for the first structural mode are located at an angle of about $\theta = \pm 45°$, $\pm 135°$ taken along a circumferential arc from the force vector 130. The force vector 130 is located at the center of the energized stator pole.

When each stator pole 102 is energized, each pole has its individualized first mode nodal points. In particular, as the poles 102 are commutated, such as by the motor controller 36 of FIG. 1, the nodal points rotate at the commutation speed. That is, the nodal points of the stator 92 at any given time correspond to only the stator pole or poles 102 which are energized at that time. If the contact areas 100 included lines 138, which extend radially through the stator poles 102, substantial amounts of vibration of the first structural mode would be transmitted to the housing 80. This would result in a significant amount of undesirable acoustic noise because, for the four phase example shown in FIG. 6, the maximum displacement points of the stator 92 are located at about the center of the stator poles 102.

Accordingly, for the four phase motor example being described, a suitable location for the contact areas 100 is the points located proximate the nodal points of the first structural mode, but spaced circumferentially from the center of the stator poles 102. This minimizes the vibrational transmission as the electric motor 52 is energized, regardless of which stator pole 102 is energized.

In this preferred embodiment, suitable contact areas 100 are selected at about $360°/2n$ away from the center of each stator pole and where n is the number of stator poles, which is illustrated as $\Theta/2$ in FIG. 3, where $\Theta$ is the angular displacement between stator poles. This positions the contacting areas 100 at a location substantially intermediate the lines 138 through at least some adjacent pairs of said stator poles. As shown in FIG. 3, the contact areas 100 are located at about 22.5° away from the centerlines 138 of each stator pole 102. The axially extending contact areas 100, thus, are moved away from the most sensitive point for vibration transmission, namely the center of the stator poles 102 themselves. It will be apparent to those skilled in the art that the location of contact areas 100 will be different for a motor having a different number of phases from the four phase motor described herein.

In order to provide for appropriate damping and a decrease in the acoustic noise, the spaces between the housing 30 and the stator 92 intermediate the axially extending contacting points 100 may be filled with a suitable damping material 140. The damping material 140 may be a flexible material having substantial hysteresis, such that vibrational energy will dissipate and not be transmitted to the housing 80. For example, the damping material 140 may be a suitable rubber, plastic or hollow foam material.

In view of the foregoing, it is shown that the electric assist motor assembly 50, in accordance with the present invention, advantageously reduces acoustic noise when compared to a conventional electric motor assembly. As described above, this is accomplished by reducing the amount of contact between the motor housing 80 and the outer sidewall portion 98 of the stator 92. Contact areas 100 between the stator 92 and the housing 80 are located adjacent the nodal points of the dominant structural mode of the stator. It will be apparent to those skilled in the art that the placement of the axially extending contact areas 100 will vary as a function of the number of stator poles 102.

From the above description of the invention, those skilled in the art will perceive improvements, changes and modifications. Such improvements, changes and modifications within the skill of the art are intended to be covered by the appended claims.

Having described the invention, the following is claimed:

1. An electric motor assembly for a vehicle steering system comprising:

a housing having an elongated cylindrical sidewall portion configured for mounting in a vehicle;

a stator disposed within and fixed relative to said housing, said stator having an interior portion, said interior portion including a plurality of stator poles disposed in a circular array, said stator having an outer sidewall portion the majority of which is spaced radially from said sidewall portion of said housing, said outer sidewall portion of said stator engaging said sidewall portion of said housing only at a plurality of predetermined spaced apart axially extending contact areas of said outer sidewall portion of said stator, each of said axially extending contact areas being located between rather than at structural nodes of said stator to reduce acoustic noise upon operation of said motor assembly, one of said plurality of contact areas being located midway between each set of adjacent pairs of said stator poles and not at any one of said stator poles; and a rotor disposed within and rotatable relative to said stator, said rotor including a plurality of rotor poles disposed in a circular array adjacent to and spaced from said circular array of stator poles, said rotor being operatively connectable to an axial shaft, said rotor rotating in response to energization of said stator.

2. The motor assembly of claim 1 wherein said axially extending contact areas are located spaced from and halfway between lines extending radially through the center of adjacent pairs of said stator poles.

3. The motor assembly of claim 1 wherein said axially extending contact areas protrude radially inward from said sidewall portion of said housing.

4. The motor assembly of claim 1 further comprising a controller for controlling energization of said stator, said stator effecting rotation of said rotor relative to said stator upon energization by said controller which, in turn, effects turning movement of a steering member for effecting turning movement of steerable wheels of a vehicle, the steering member being drivingly connected with said rotor.

5. The motor assembly of claim 1 wherein said stator has a first structural mode with nodal points, said plurality of contact areas being located as a function of said nodal points of said first structural mode to reduce acoustic noise of said motor assembly.

* * * * *